(12) United States Patent  (10) Patent No.: US 8,977,746 B2
Hughes et al.  (45) Date of Patent: Mar. 10, 2015

(54) SYSTEMS AND METHODS FOR SCALABLE NETWORK MONITORING

(71) Applicant: Watchguard Technologies, Inc., Seattle, WA (US)

(72) Inventors: Mark D. Hughes, Spokane, WA (US); Eivind Naess, Auburn, WA (US)

(73) Assignee: Watchguard Technologies, Inc., Seattle, WA (US)

( * ) Notice: Subject to any disclaimer, the term of this patent is extended or adjusted under 35 U.S.C. 154(b) by 0 days.

(21) Appl. No.: 13/871,896

(22) Filed: Apr. 26, 2013

(65) Prior Publication Data

US 2014/0289390 A1    Sep. 25, 2014

Related U.S. Application Data

(60) Provisional application No. 61/803,743, filed on Mar. 20, 2013.

(51) Int. Cl.
*G06F 15/173* (2006.01)
*H04L 12/26* (2006.01)
*G06F 21/52* (2013.01)
*H04L 29/06* (2006.01)

(52) U.S. Cl.
CPC ............ *H04L 43/0882* (2013.01); *G06F 21/52* (2013.01); *H04L 63/02* (2013.01); *H04L 43/026* (2013.01); *H04L 43/028* (2013.01); *H04L 43/045* (2013.01); *H04L 12/2621* (2013.01); *H04L 43/0876* (2013.01)
USPC ............................................. 709/224; 726/11

(58) Field of Classification Search
CPC ... H04L 29/06; H04L 29/08072; H04L 43/00; H04L 12/2602; H04L 41/22
See application file for complete search history.

(56) References Cited

U.S. PATENT DOCUMENTS

| | | | |
|---|---|---|---|
| 6,678,827 B1 * | 1/2004 | Rothermel et al. | 726/6 |
| 6,738,908 B1 * | 5/2004 | Bonn et al. | 726/4 |
| 6,834,350 B1 * | 12/2004 | Boroughs et al. | 726/3 |
| 7,237,263 B1 * | 6/2007 | Boscolo et al. | 726/15 |
| 8,018,943 B1 * | 9/2011 | Pleshek et al. | 370/392 |
| 2009/0172148 A1 * | 7/2009 | Underwood | 709/224 |
| 2010/0037296 A1 * | 2/2010 | Silverstone | 726/3 |
| 2012/0290956 A1 * | 11/2012 | Lance et al. | 715/764 |

* cited by examiner

*Primary Examiner* — Lisa Lewis
*Assistant Examiner* — Maung Lwin
(74) *Attorney, Agent, or Firm* — Kory D. Christensen; Stoel Rives LLP

(57) ABSTRACT

A network security device may gather a large amount of metadata pertaining to the connections being managed thereby. A refinement module may filter and/or aggregate the connection metadata. The metadata may be refined on the network security device. The refined metadata may be provided for display on a terminal. The refined metadata may include a subset of the larger connection metadata, which may reduce the overhead required to display and/or transmit monitoring information to the terminal device. The refined metadata may comprise connection groups, which may be formed based on aggregation criteria, such as connection source, destination, application, security policy, protocol, port, and/or the like. The connection groups may be ranked in accordance with ranking criteria.

18 Claims, 6 Drawing Sheets

SYSTEMS AND METHODS FOR SCALABLE NETWORK MONITORING

CROSS-REFERENCE TO RELATED APPLICATIONS

This application claims priority to U.S. Provisional Patent Application Ser. No. 61/803,743, entitled, "Systems and Methods for Scalable Network Monitoring," filed Mar. 20, 2013, for Mark Hughes et al., and which is hereby incorporated by reference.

TECHNICAL FIELD

This disclosure relates to network monitoring and, in particular, to systems and methods for monitoring and/or visualizing a large number of concurrent connections.

BACKGROUND

Network security devices may be used to process a large number of connections. Each connection may be associated with descriptive metadata, which may include, but is not limited to: the connection source, destination, port, security policy, connection duration, connection timing, bandwidth, quality of service, and so on. Monitoring connections may, therefore, require gathering, transferring and/or displaying a large amount of data. Moreover, even if such data were capable of being efficiently transferred and/or displayed, the volume of information may overwhelm the user.

SUMMARY

Disclosed herein are embodiments of a system, comprising a network security device communicatively coupled to an internal network and an external network, wherein the network security device is configured to manage a plurality of connections between entities in the internal network and entities in the external network, a monitoring module configured to acquire connection metadata describing the respective connections, a refinement module operating on the network security device, wherein the refinement module is configured to determine refined metadata from the connection metadata, and wherein the refined metadata comprises a subset of the connection metadata, and/or a communication module configured to provide the refined metadata to a terminal. The refinement module may be configured to generate an abstract representation of the connections by filtering the connection metadata in accordance with a designated connection property.

In some embodiments, the communication module is configured to receive a selection of the designated connection property from a user. The refinement module may be configured to generate the refined metadata in response to receiving the selection. The connection property is one of: connection source, connection destination, application, connection port, connection protocol, and security policy.

The refinement module may be further configured to generate connection group metadata by aggregating the filtered connection metadata into respective connection groups based on an aggregation criteria. The aggregation criteria may include one or more of: connection source, connection destination, application, connection port, connection protocol, geographic location, and security policy. The metadata refinement module may be configured to order the connection groups according to a selected property of the connection groups. The selected property may include one or more of: aggregate connection count, aggregate bandwidth, and aggregate connection duration.

The system may include an interface module configured to generate an interface configured to display information pertaining to the connection groups on a display of the terminal. The refinement module may be configured to assign weights to the connection groups in accordance with a value of a selected property of the respective connection groups. The interface module may be configured to display the information pertaining to the connection groups in accordance with the assigned weights.

Disclosed herein are embodiments of a method efficiently monitoring network connections. The disclosed method may comprise gathering metadata pertaining to network connections being managed by a network security device, the gathered metadata comprising entries configured to represent respective network connections, filtering the connection metadata to focus on a designated connection characteristic, grouping, at the network security device, the filtered connection metadata into a plurality of connection groups based on a selected field of the filtered connection metadata, each connection group configured to represent one or more network connections, and/or transmitting information pertaining to the connection groups to a display terminal. The method may further comprise generating an interface, at the network security device, configured to display the information pertaining to the connection groups on the display terminal, wherein transmitting the information pertaining to the connection groups comprises transmitting the interface to the display terminal via a network.

In some embodiments, the method includes assigning a relative priority to the connection groups based on respective values of an aggregate property of the connection groups, wherein the interface is configured to display the information pertaining to the connection groups in accordance with the assigned relative priority of the connection groups. The aggregate property of the connection groups may correspond to one or more of: connection group bandwidth, connection count, and duration. The method may further comprise receiving a designation of a connection characteristic from a user, and/or generating the summary connection metadata and connection groups in response to the designation.

Disclosed herein are other embodiments of a method for efficient network monitoring. The disclosed method may include accessing connection metadata pertaining to network connections managed by a network security device, the connection metadata corresponding to network connections between entities in an internal network and entities in an external network, refining the connection metadata in accordance with a designated aggregation criteria at the network security device, wherein the refined connection metadata comprises plurality of connection groups, and wherein each connection group corresponds to a plurality of the network connections, ordering the connection groups based on a ranking criteria, and/or transmitting the refined connection metadata comprising the weighted connection groups to a display terminal.

The method may further comprise generating an interface configured to display the ordered connection groups. The interface may comprise interface entries configured to represent respective connection groups, and the interface entries may be sized in accordance to the relative importance of the corresponding connection groups. The method may further include receiving a selection of the ranking criteria through an input of the interface. The aggregation criteria may comprise a grouping characteristic, and refining the connection metadata may comprise aggregating connection metadata of connection entries having the same grouping characteristic.

DETAILED DESCRIPTION OF PREFERRED EMBODIMENTS

Figure 1:
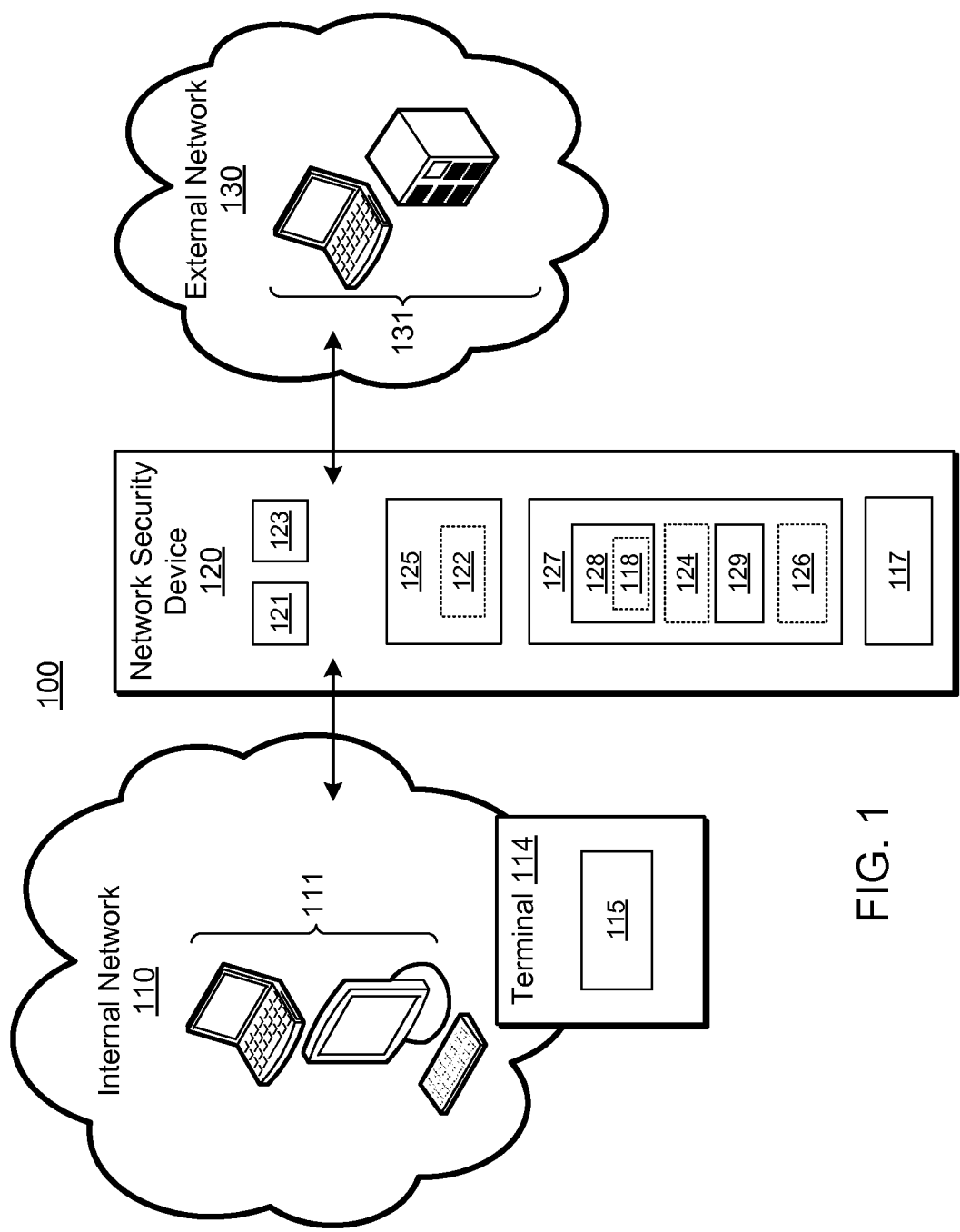
FIG. 1 depicts one embodiment of a system for scalable network monitoring.

Disclosed herein are systems and methods for abstracting and categorizing network security device connection information into relevant parts for purposes of real-time and/or historical display and monitoring in a scalable manner. Network security devices may be configured to gather monitoring data pertaining to the connections being managed thereby. The metadata describing a connection may comprise a significant amount of data. Metadata describing a connection may be embodied in various formats and/or encodings including, but not limited to: one or more proprietary binary data formats, text, eXtensible Markup Language (XML), and/or the like. In some embodiments, connection metadata is embodied as XML metadata, as follows:

```
<connection pcy-name="Outgoing-00" proto="6" src-
ip="10.0.1.10" src-port="56000" dst-ip="172.8.1.1" dst-
port="80" src-nat-ip="" src-nat-port="" dst-nat-ip="" dst-
nat-port="" in-if="Trusted" out-if="External"
blocked="false" packets-in="3663" bytes-in="212502"
packets-out="1836" bytes-out="117547" conn-time="1
362760047" src-user="Any" dst-user="Any"/>
```

The connection metadata may include additional information not explicitly enumerated herein including, but not limited to: geographic information, threat assessment information (e.g., likelihood that the connection poses a security threat), security metadata (e.g., secure sockets layer metadata, authentication credentials, etc.), traffic shaping metrics, bandwidth characteristics, an identifier of the application and/or process associated with the connection, and so on.

The amount of data used to describe a connection may vary in accordance with the capabilities and/or configuration of the network security device. The metadata describing each connection may comprise a significant amount of data (several kilobytes (kb) or more). Network security devices that service a large number of connections may maintain large amounts of connection metadata. For example, a network security device servicing 100 new connections per second, each connection comprising a 1 kb metadata entry, will generate 30 megabytes of metadata over a 5 minute period. Network activity may be monitored through one or more remote terminals. Monitoring the network security device may comprise transferring connection metadata from the network security device to the remote terminal for display. Transferring the connection metadata may create performance issues, particularly where the network security device is handling a large number of connections.

For example, firewall connection traffic may be monitored by gathering a list of firewall connections. The list of connections may be displayed in various ways, including a graphical view comprising two columns, one for source addresses and one for destination addresses. The graphical view may further include connecting lines between the columns to visually represent firewall connections between the displayed source(s) and destination(s). In another embodiment, the display may comprise a textual grid view of all connections. Each row contains information about the individual connection such as source, destination, port, bytes, etc. The large quantity of data may increase the load on the network security device (firewall), internal network, and/or terminal. Moreover, the interfaces used to display the connection information may not be scalable when there are large numbers of connections to display; the graphical column and/or table views disclosed above may become difficult or impossible to interpret when large numbers of connections are being displayed.

Disclosed herein are embodiments of a system for scalable network monitoring. The system may comprise a monitoring module configured to gather metadata pertaining to network connections that are being serviced by a network security device, as disclosed above. The system may further comprise a monitoring aggregation module that is configured to reduce monitoring overhead by, inter alia, generating refined connection metadata describing the connections managed by the network security device. The refined connection metadata may be derived from the connection metadata. In some embodiments, the refined connection metadata comprises a subset of the connection metadata (filtered connection metadata). Alternatively, or in addition, the refined connection metadata may represent connection groups (e.g., aggregating a plurality of connections into a single entry in the refined connection metadata). Generating the refined metadata summary may comprise: a) generating abstract representations of the connections by, inter alia, filtering the connection metadata to focus on a designated aspect of the connections; and b) aggregating the connections into one or more connection groups based on an aggregation criteria, which may be based on one or more selected connection properties and/or characteristics. Aggregating the connection metadata may comprise combining entries having the same grouping characteristic (e.g., combining entries pertaining to the same user, destination, application, and/or the like). Due to the filtering and/or aggregation steps disclosed above, the size of the refined connection metadata may be several orders of magnitude smaller than the full set of connection metadata, and as such, the amount of data that is transferred to/from the network security device may be significantly reduced.

FIG. 1 is a block diagram of one embodiment of a system 100 for scalable network monitoring. The system 100 may include a network security device 120 configured to securely connect entities 111 within an internal network 110 to entities 131 in an external network 130 (e.g., the Internet). The entities 111 and/or 131 may include, but are not limited to: personal computing devices, smartphones, tablets, personal digital assistants (PDAs), servers (e.g., web servers, email servers, etc.), and/or the like. The network security device 120 may be implemented using a computing device comprising, inter alia, a processor 121 and non-transitory, computer-readable storage medium 123. The network security device 120 may be a firewall, router, server, and/or the like. The system 100 may further comprise a terminal 114 configured to display monitoring information pertaining to the network security device 120 (on a display device 115). The terminal 114 may comprise any computing device capable of displaying monitoring information including, but not limited to: a personal computer, a laptop, a notebook, a tablet, a smartphone, a PDA, and/or the like.

The network security device 120 may comprise a monitoring module 125 configured to gather metadata 122 pertaining to connections established between entities 111 in the internal network 110 and entities 131 in the external network 130. The metadata 122 may include, but is not limited to: source information (e.g., information pertaining to the source of the connection within the internal network 110), such as a source name, source address, source port, source user, source group, source application, etc., destination information (e.g., information pertaining to the destination of the connection within the external network 130) such as destination name, destination address, destination port, etc., security information pertaining to the connection, security policy information, connection bandwidth (e.g., bytes transferred over the connection), connection duration, quality of service (QoS), connection timestamps (e.g., the time the connection was established, closed, etc.), and so on. Accordingly, connection metadata 122 may include information pertaining to a network connection, along with higher-level information, such as user and/or group identifiers, security policy information, QoS information, and the like.

The terminal 114 may be configured to access the connection metadata 122 maintained at the network security device 120 and to present the connection metadata 122 on the display 115. The network security device 120 may be capable of supporting a large number of concurrent connections. As such, transferring the connection metadata 122 to the terminal 114 may impose a significant overhead on the internal network 110, network security device 120, and/or terminal 114. Moreover, even if the connection metadata 122 were available at the terminal 114, it may be difficult to display in a way that is comprehensible to a human user.

In some embodiments, the network security device 120 comprises a refinement module 127 configured to generate refined metadata 124. The refinement module 127 may be configured to operate on the processor 121 of the network security device 120. Furthermore, instructions configured to cause the processor 121 to implement operations and/or steps of the refinement module 127 may be stored on the non-transitory, computer-readable storage medium 123 of the network security device 120.

The refinement module 127 may be configured to determine the refined metadata 124 from the full set of connection metadata 122 gathered at the network security device 120. The refined metadata 124 may comprise a subset and/or aggregation of the connection metadata 122. The system 100 may further comprise an interface module 129 configured to generate an interface 126 configured to display the refined metadata on the terminal 114 (on a display device 115). The interface 126 may comprise a web page (content in Hypertext Markup Language (HTML) format) or the like. The interface 126 may be provided to the terminal 114 by use of a communication module 117. In some embodiments, the communication module 117 comprises a web server (and/or other service) configured to serve interfaces 126 configured for rendering within, inter alia, a browser application operating on the terminal 114. As disclosed in further detail herein, users may access more detailed information pertaining to particular connections by navigating within one or more interfaces displayed on the terminal 114.

The refinement module 127 may be configured to generate abstract representations of the connections being managed by the network security device 120. The abstract representations may comprise a subset of the metadata pertaining to the connections. The abstract representations may be configured to focus on a particular, designated aspect of the connection, which may include, but is not limited to: source, destination, bandwidth, duration, and/or the like. Accordingly, the abstract representations may include a filtered subset of the connection metadata 122; an abstract representation configured to focus on connection bandwidth may, for example, omit metadata pertaining to security policy, port, destination, and the like; in another example, an abstract representation configured to focus on security policy may omit source and/or destination information, and so on.

The refinement module 127 may be further configured to aggregate the abstract metadata into connection groups. The connection groups may be formed using an aggregation criteria; e.g., by aggregating abstract representations that share a selected property and/or characteristic (e.g., have a common field value). The aggregation criteria may be selected in accordance with the filtering criteria disclosed above. Connections may be aggregated based on one or more of: source (user), destination, application, protocol, security policy, and/or the like. An entry in refined metadata 124 representing "N" connections established by user "10.0.1.10" within the internal network 110 may be represented as follows:

<item><name>10.0.1.10</name><bytes>4580</bytes><connections>N</connections><duration>79</duration></item>

The exemplary refined connection metadata 126 above may be generated by combining abstract representations of N separate connections, each of which may comprise a full entry within the connection metadata 122.

The filtering and/or aggregation criteria used by the refinement module 127 may be designated and/or selected by a user through, inter alia, the interface 126 and/or through a configuration interface 128 of the refinement module 127. For example, although there may be thousands of unique connections passing through the network security device 120, there are typically a much smaller number of unique users generating those connections. A user of the terminal 114 may configure the refinement module 127 to filter and/or group connection metadata 122 by user, which may comprise: a) generating abstract metadata representations of connections configured to focus on connection source information; and b) aggregating the abstract metadata representations into groups based on source user. In another embodiment, a user of the terminal 114 may configure the refinement module 127 to filter and/or group connection metadata 122 by application, which may comprise: a) generating abstract representations of connections configured to focus on the application associated with the connections; and b) aggregating the abstract metadata representations into groups based on application. In some embodiments, the refinement module 127 is configured to create the refined metadata 124 in a single iteration through the connection metadata 122 (filter and/or aggregate the filtered connection information in a single operation).

As disclosed above, the system 100 may comprise an interface module 129 configured to generate an interface 126 configured to display the refined metadata 124. The refined metadata 124 and/or interface 126 may be significantly smaller than the full set of connection metadata 122. In addition, the interface 126 may be configured to display the refined metadata 124 in accordance with an assigned order, weight and/or priority. In some embodiments, the refinement module 127 is configured to determine a relative weight of the connection groups in the refined metadata 124 based on, inter alia, a ranking criteria. The weight of a connection group may correspond to the value of a particular characteristic and/or property of the group (e.g., the value of a particular field). For example, connection groups pertaining to the number of connections established by each user may be ordered and/or weighted by a connection count value; accordingly, the ranking criteria may be the aggregate connection value of the connection group. In another example, connection groups pertaining to the bandwidth consumed by particular applications may be weighted in accordance with bandwidth consumption (the ranking criteria may be the aggregate bandwidth consumed by each connection group).

In some embodiments, the refinement module 127 is configured to select filtering, aggregation, and/or ranking criteria in response to a request for monitoring information. The request may designate particular connection properties and/or characteristics that are of interest (e.g., bandwidth, connection count, etc.). The metadata refinement module 127 may use the designated connection properties and/or characteristics to filter the connection metadata 122, as disclosed herein. The request may further indicate an aggregation and/or ranking criteria (e.g., grouping property and/or characteristic). The aggregation criteria may be configured to group connection by source (user), destination, protocol, port, application, security policy, and/or the like, as disclosed herein. In some embodiments, the configuration interface 128 of the refinement module 127 may comprise one or more monitoring templates 118. The monitoring templates 118 may include filtering and/or aggregation criteria corresponding to pre-determined monitoring tasks, which may include, but are not limited to: identifying users that are consuming the most network bandwidth; identifying applications having the most open connections; most visited websites (by user); most used security policies; and so on. Each monitoring template 118 may, therefore, comprise respective filtering and/or aggregation criteria configured to refine the connection metadata 122 in accordance with a particular monitoring task. For example, the monitoring template 118 to identify high-bandwidth users may be configured to filter the connection metadata 122 to include connection source and bandwidth, and the aggregation criteria may be configured to form connection groups on a per-source basis (e.g., per-user), resulting in connection groups that reflect the aggregate connection bandwidth for each user. An application bandwidth monitoring template 118 may be configured to filter connection metadata 122 to include application-identifying information and, optionally, connection bandwidth, and the aggregation criteria may group the connection metadata by application identifier, resulting in connection group metadata that reflects the aggregate connection count on a per-application basis. Although particular examples of monitoring templates 118, filtering criteria, and aggregation criteria are provided herein, the disclosure is not limited in this regard, and could be adapted to filter and/or group connection metadata 122 according to any suitable criteria.

Figure 2:
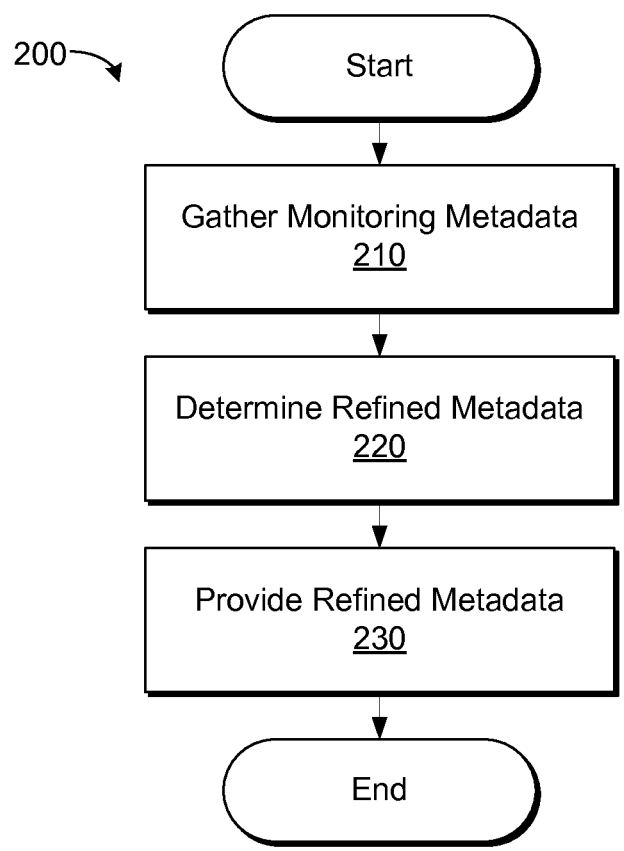
FIG. 2 is a flow diagram of one embodiment of a method for scalable network monitoring.

FIG. 2 is a flow diagram of one embodiment of a method 200 for scalable network monitoring. Steps and/or operations of the method 200, and other methods disclosed herein, may be implemented using, inter alia, hardware components, such as processors, computer-readable storage media, communication interfaces (e.g., network interfaces), and the like. Furthermore, portions of the disclosed methods may be embodied as instructions stored on a computer-readable storage medium; the instructions may be configured for execution by a computing device to perform one or more of the disclosed method steps and/or operations.

Step 210 may comprise gathering connection metadata 122 at a network security device 120, as disclosed herein. The connection metadata may correspond to connections between entities 111 in an internal network 110 and entities 131 in an external network 130. The connection metadata 122 may comprise a plurality of characteristics and/or properties of the connection. In some embodiments, the connection metadata 122 represents the full set of metadata describing the connections (e.g., the connection metadata 122 may comprise all of the information known about the connection by the network security device 120).

Step 220 may comprise generating refined metadata 124 by use of, inter alia, the connection metadata 122 gathered at step 210. Step 220 may be performed by the refinement module 125 operating on the network security device 120. Generating the refined metadata 124 may comprise a) filtering the connection metadata 122 to focus on a designated connection aspect, property, and/or characteristic and/or b) aggregating the metadata into one or more connection groups, as disclosed herein.

Step 230 may comprise providing the refined metadata 124 to a terminal 114 via a network (internal network 110 and/or external network 130). In some embodiments, step 230 further comprises generating an interface 126 configured to display the refined metadata 124. The interface 126 may comprise content configured to be rendered by a browser application operating on the terminal 114. The content may be provided by use of the communication module 117, which, in some embodiments, may comprise a web server.

Figure 3:
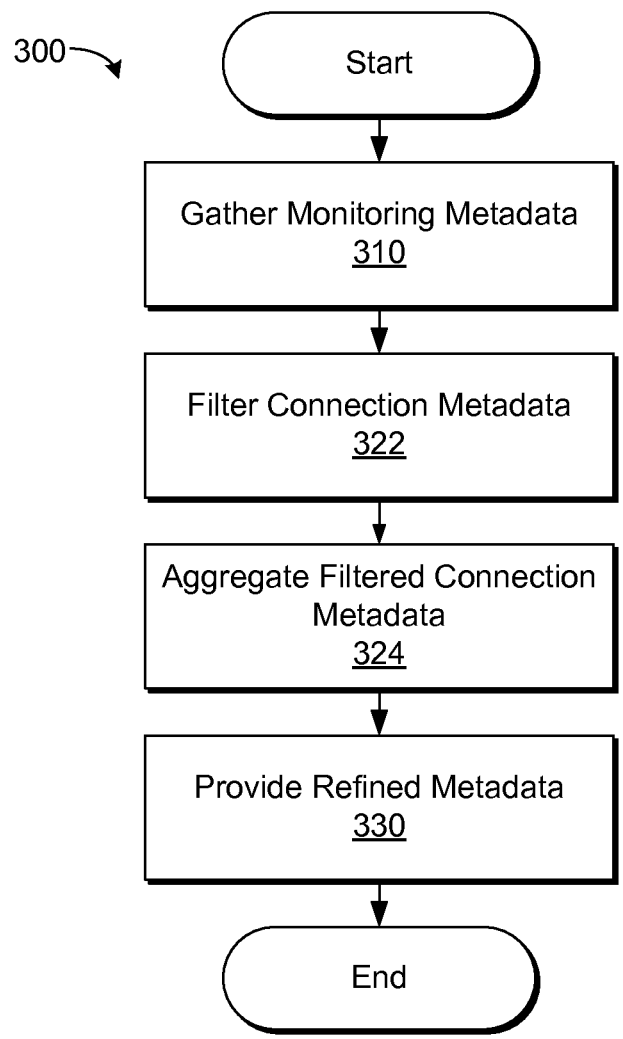
FIG. 3 is a flow diagram of another embodiment of a method for scalable network monitoring.

FIG. 3 is a flow diagram of another embodiment of a method 300 for scalable network monitoring. Step 310 may comprise gathering connection metadata 122, as disclosed herein. Step 322 may comprise filtering the connection metadata 122 according to a filtering criteria. The filtering criteria may correspond to one or more designated aspects of the connection metadata 122, such as connection source, connection destination, application, connection port, connection protocol, security policy, and the like. Step 322 may comprise identifying a connection property and/or characteristic of interest in response to a user request received via the communication module 117, configuration interface 128, and/or the like. Filtering at step 322 may comprise selecting a subset of metadata from the connection metadata 122 (e.g., a subset of the connections and/or individual connection fields) to generate, inter alia, abstract representations of one or more connections.

Step 324 may comprise aggregating the filtered connection metadata (abstract connection representations) into one or more connection groups. The connection groups may be formed based on, inter alia, an aggregation criteria, which may correspond to one or more selected connection properties and/or characteristics. As disclosed herein, aggregation criteria may include, but is not limited to: connection source, connection destination, application, connection port, connection protocol, connection security policy, and the like. Step 324 may comprise combining a plurality of connection entries (e.g., abstract connection metadata entries) into respective connection group entries. Accordingly, each connection group may correspond to a plurality of separate connections within the connection metadata 122. Step 324 may comprise identifying the aggregation criteria in response to a user request received via the communication module 117, configuration interface 128, and/or the like, as disclosed above. Step 324 may further comprise ranking the connection groups within the refined metadata 124 in accordance with a designated ranking criteria, as disclosed herein.

Step 330 may comprise providing the refined metadata 124 (e.g., metadata pertaining to the connection groups) to the terminal 114, as disclosed herein. Step 330 may, therefore, comprise generating an interface 126 configured to display the refined metadata 124, such as an HTML interface, or the like.

Figure 4:
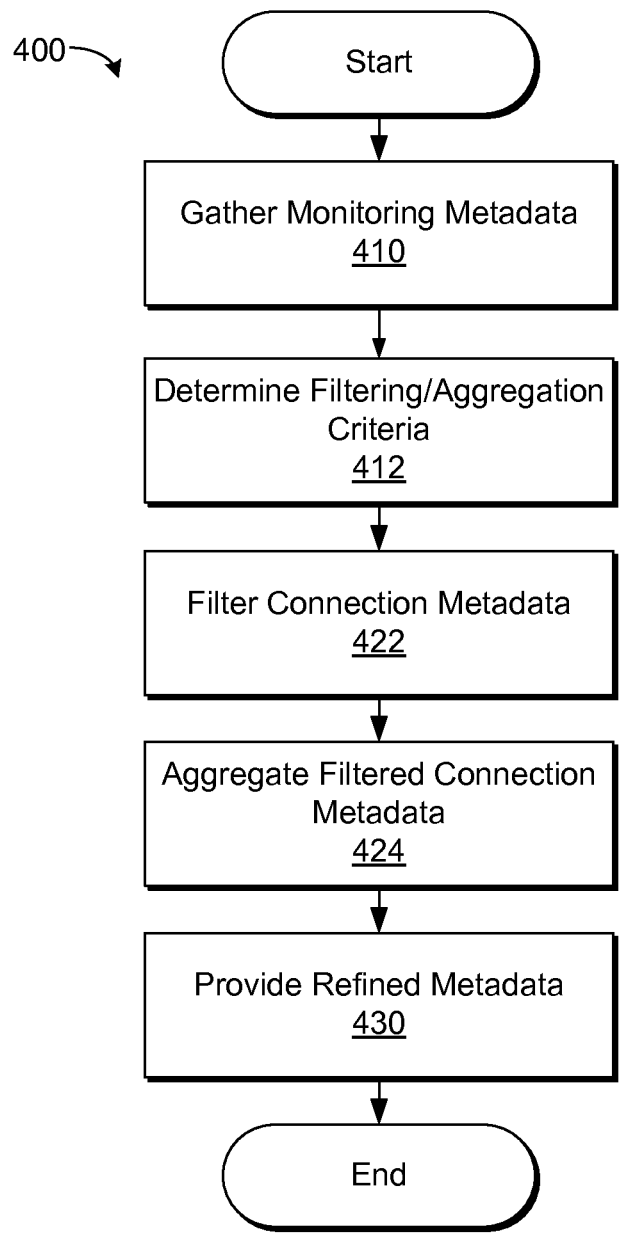
FIG. 4 is a flow diagram of another embodiment of a method for scalable network monitoring.

FIG. 4 is a flow diagram of another embodiment of a method 400 for scalable network monitoring. Step 410 may comprise gathering connection metadata 122 as disclosed herein. Step 412 may comprise receiving a request for monitoring information. The request may be received from the terminal 114 through the communication interface 117 and/or configuration interface 128. The request may comprise an indication of which connection properties and/or characteristics are of interest. The indication may comprise filtering and/or aggregation criteria, as disclosed herein. Alternatively, or in addition, the indication may comprise the selection of a metadata template 118 from which the refinement module 127 may derive the filtering and/or aggregation criteria, as disclosed above.

Steps 422 and 424 may comprise generating refined metadata 124 by filtering 422 the connection metadata 122 in accordance with the filtering criteria of step 412 and/or aggregating the filtered connection metadata in accordance with the aggregation criteria of step 412.

Step 430 may comprise providing the refined metadata 124 to the terminal 114. As disclosed herein, step 430 may comprise generating an interface configured to display the refined metadata 124. Steps 410, 412, 422, 424, and 430 may be implemented on the network security device 120.

Referring back to FIG. 1, in some embodiments, the refinement module 127 is configured to order and/or assign respective weights and/or priorities to connection group metadata based on, inter alia, one or more properties and/or characteristics of the groups. The ranking criteria may correspond to one or more of: aggregate bandwidth of connections in the connection group, aggregate connection count of the group, average duration of the connections, and the like. The interface module 129 may configure the interface 126 to display the refined metadata 124 in accordance with the assigned weights.

Figure 5:
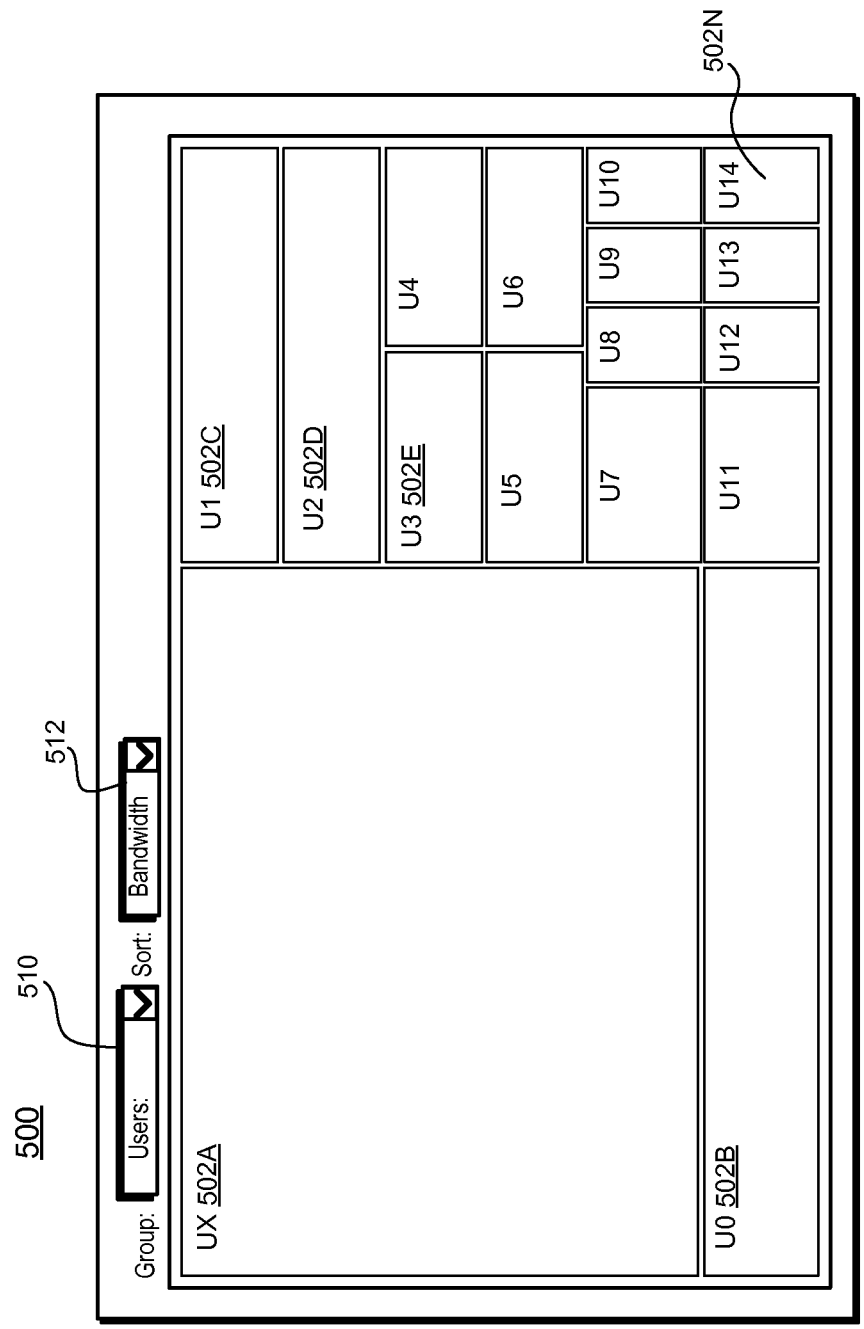
FIG. 5 depicts one embodiment of an interface for scalable network monitoring.

In some embodiments, the refined metadata 124 may be displayed using a "treemap" interface. As used herein, a treemap interface refers to an interface configured to display a plurality of entries, wherein each entry is displayed in accordance with a respective weight. FIG. 5 depicts one embodiment of an interface 500 configured to display prioritized, refined connection metadata 124. In the FIG. 5 embodiment, the entries indicate the bandwidth used by particular users (connection sources). The entry corresponding to "UX" 502A is larger than the other entries 502B-N, indicating that user UX is currently using more bandwidth than users U0-14. Similarly, user U0 502B is using more bandwidth than U1 502C, and so on.

The interface 500 may comprise a grouping input 510, which may be used to select an aggregation criterion for the refined metadata 124 displayed within the interface 500. In the FIG. 5 embodiment, the selected grouping criterion is "users," and, as such, the entries 502A-N correspond to connection groups formed by aggregating connection metadata on the basis of connection source (source user). The input 510 may provide for specifying other aggregation criteria, which, as disclosed herein, may include, but is not limited to: application, destination, protocol, port, security policy, and/or the like. The filtering criteria may be inferred from the selected aggregation criteria and/or the configuration of the interface 500. In the FIG. 5 embodiment, the interface 500 includes indications of connection source and bandwidth. Accordingly, the filtering criteria may comprise selection of the connection source and/or connection bandwidth within the respective connection entries of the connection metadata 122. Alternatively, or in addition, the refinement module 127 may be configured to gather additional information to enable users to view more detailed information in response to selecting entries 502A-N within the interface 500.

The interface 500 may further comprise a sort input 512, which may be used to specify a ranking criteria for the refined metadata 124 displayed within the interface 500. As disclosed above, the depicted entries 502A-N are weighted according to aggregate bandwidth (the combined bandwidth of the connections of respective users). Accordingly, the relative size of the entries 502A-N may correspond to the amount of bandwidth used by the respective users UX and U0-14. The refined metadata 124 may be ordered according to any property and/or characteristic including, but not limited to: aggregate connection count, connection duration, and/or the like.

The inputs 510 and 512 may be used to define the filtering, aggregation, and/or ranking criteria used by the refinement module 124 to generate and/or order the refined metadata 124. Accordingly, in some embodiments, modifying the selection of input 510 and/or 512 may result in issuing a request from the terminal 114 to the network security device 120 (refinement module 127) for an updated set of refined metadata 124 that is filtered, aggregated, and/or weighted according to the selection(s) in inputs 510 and/or 512. For example, modifying the input 510 from "users" to "applications" may result in requesting refined metadata 124 comprising connection groups aggregated on the basis of connection application as opposed to user. In another example, modifying the input 512 from "bandwidth" to "connections" may result in requesting refined metadata 124 comprising connection groups that are ordered in accordance with connection count as opposed to bandwidth.

In some embodiments, the entries 502A-N of the interface 500 may be selectable. A user may select an entry 502A-N to view more detailed information pertaining to the selected connection group (e.g., additional connection metadata 122 pertaining to the connections established for a particular user). Accordingly, selecting the entry U7 may comprise requesting display of the connection metadata 122 pertaining to the connections to/from user U7 on the network security device 120.

In some embodiments, the refined metadata 124 transmitted to the terminal 114 (and displayed in the interface 500) may be filtered, grouped, and/or weighted by the refinement module 127 on the network security device 120. Furthermore, in some embodiments, the interface 500 may be generated by the interface module 129 operating on the network security device 120. Accordingly, terminal 114 may not have to perform additional parsing and/or post processing in order to display the refined metadata 124, which may allow low-powered devices to be used to monitor the network security device 120, such as smart phones, PDAs, tablets, and the like.

Figure 6:
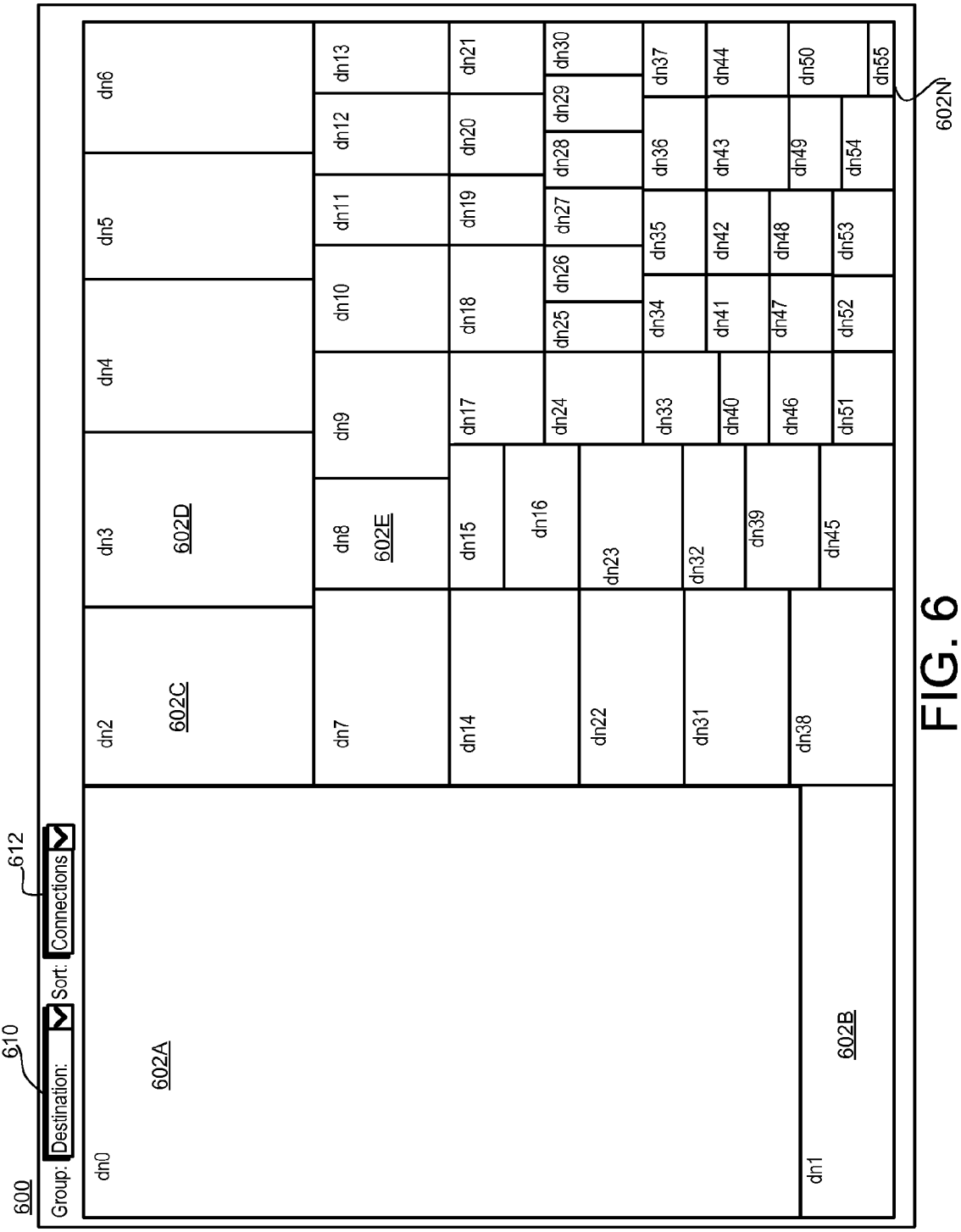
FIG. 6 depicts another embodiment of an interface for scalable network monitoring.

As disclosed above, the refinement module 127 may be configured to filter, aggregate, and/or weight connection metadata 122 according to various connection properties and/or characteristics. The interface module 129 may be configured to generate interfaces 126 configured to display the refined metadata 124 in accordance with the designated filtering, aggregation, and/or ranking criteria. FIG. 6 depicts another embodiment of an interface 600 configured to display refined metadata 124. In the FIG. 6 embodiment, the refined metadata 124 comprises connection groups formed by aggregating connection destination information (destination host).

Accordingly, each entry 602A-N in the interface 600 may represent a group of connections from the internal network 110 to a particular domain within the external network 130 (per the grouping input 610). The sort input 612 may be a set of "connections," which may configure the refinement module 127 to weight the entries 602A-N in accordance with the aggregate number of connections to each domain dn0-55. In the FIG. 6 embodiment, the majority of the connections being managed by the network security device 120 pertain to dn0, and other sites dn1-5 also comprise a significant portion of the current connections. The interface 600 may, therefore, enable an administrator to identify the network destinations corresponding to the network traffic being serviced by the network security device 120. In other embodiments, the interface 600 may display geographic information, such as the location of network destinations corresponding to the connections being managed by the network security device 120, and so on. Such information may enable an administrator to identify the location from which certain types of attacks are originating (e.g., denial of service, or the like).

Many different types of end user visualizations may be generated using the summarized connection information, which may be used to address various monitoring questions and/or issues, such as: what user is using the most bandwidth on the network; what applications are using the most bandwidth; what web sites has a particular user visited; what security policies are used the most; and so on.

As disclosed above, treemap visualizations may be used to display the refined metadata 124 in an easily digestible format. A user can quickly determine who is using the network, what sites are being visited, and many other metrics by viewing, grouping, and pivoting interface inputs 610 and/or 612. The disclosure is not limited in this regard, however, and could be adapted to use any suitable visualization and/or interface mechanisms.

A user may leverage the interfaces 500 and/or 600 to access more detailed connection information. Selecting an entry 502A-N and/or 602A-N within the interfaces 500 and/or 600 may result in issuing a request to the network security device 120 for additional metadata pertaining to a subset of the connection metadata 122. Referring back to FIG. 5, selecting entry 502A corresponding to user UX may result in issuing a request for connection metadata 122 pertaining to user UX. The metadata refinement module 127 may be configured to generate the requested metadata by, inter alia, filtering the connection metadata 122 to select entries associated with the user UX. The metadata refinement module 127 may be further configured to filter the connection metadata pertaining to user UX. Referring to the FIG. 6 embodiment, selecting the entry 602C may result in issuing a request for connection metadata 122 pertaining to connections established to the domain dn2. The metadata refinement module 127 may be configured to generate the requested metadata by, inter alia, filtering the connection metadata 122 to identify entries with the destination of dn2 (and/or equivalent).

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implement particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the disclosure.

We claim:

1. A system comprising:
  a network security computing device comprising a processor and computer-readable storage medium, the network security device communicatively coupled to an internal network and an external network, wherein the network security device is configured to manage a plurality of connections between entities in the internal network and entities in the external network;
  a monitoring module embodied on the computer-readable storage medium and executable by the processor to acquire connection metadata comprising connection entries describing respective connections;
  a refinement module embodied on the computer-readable storage medium and executable by the processor configured to generate refined connection metadata in response to the acquired connection metadata, wherein generating the refined connection metadata comprises combining connection entries to form connection groups, such that each connection group corresponds to a set of connection entries in the acquired connection metadata, and ranking the respective connection groups based on one or more of combined connection count, combined bandwidth, and connection duration a ranking criterion; and a communication module embodied on the computer-readable storage medium and executable by the processor configured to provide the refined metadata comprising the ranked connection groups to a terminal.

2. The system of claim 1, wherein the refinement module is configured to generate abstract representations of the connection entries by filtering the connection entries of the connection metadata in accordance with a designated connection property.

3. The system of claim 2, wherein the communication module is configured to receive a selection of the designated connection property from the terminal, and wherein the refinement module is configured to generate the refined metadata in response to receiving the selection.

4. The system of claim 2, wherein the designated connection property is one of: connection source, connection destination, application, connection port, connection protocol, and security policy.

5. The system of claim 2, wherein the refinement module configured to combine abstract representations of the connection entries to form the connection groups.

6. The system of claim 1, wherein the refinement module is configured to combine the connection entries into the connection groups based on an aggregation criterion, and wherein the aggregation criterion is one of: connection source, connection destination, application, connection port, connection protocol, geographic location, and security policy.

7. The system of claim 1, wherein the refinement module is configured to order the connection groups according to the ranking of the connection groups.

8. The system of claim 1, further comprising an interface module embodied on the computer-readable storage medium and executable by the processor configured to generate an interface configured to display the ranked connection groups on the terminal.

9. The system of claim 8, wherein the interface comprises interface entries configured to represent respective connection groups, and wherein the interface entries are sized in accordance to weights assigned to the corresponding connection groups.

10. A method, comprising:
gathering metadata pertaining to network connections managed by a network security device, the gathered metadata comprising connection entries configured to represent respective network connections;

aggregating, at the network security device, the connection entries into a plurality of connection groups based on a selected field of the connection entries, each connection group configured to represent one or more network connections and comprising aggregate properties derived from properties of the connection entries of the respective connection groups;

assigning weights to the connection groups based on one or more of an aggregate connection count of the respective connection groups, an aggregate bandwidth of the respective connection groups, and an aggregate connection duration of the respective connection groups; and transmitting the connection groups and the weights assigned to the connection groups to a display terminal.

11. The method of claim 10, further comprising generating an interface, at the network security device, configured to display information pertaining to the connection groups, wherein transmitting the connection groups comprises transmitting the interface to the display terminal via a network.

12. The method of claim 11, wherein the interface is configured to display the connection groups in accordance with the weights assigned to the connection groups.

13. The method of claim 10, further comprising:
receiving a designation of a connection characteristic from the display terminal; and transmitting the connection groups and weights assigned to the connection groups to the display terminal in response to the designation.

14. A non-transitory computer-readable storage medium comprising program code configured to cause a computing device to perform operations for efficient network monitoring, the operations comprising:
accessing connection metadata pertaining to network connections managed by a network security device, the connection metadata corresponding to network connections between entities in an internal network and entities in an external network;

refining the connection metadata in accordance with a designated aggregation criterion at the network security device, wherein the refined connection metadata comprises a plurality of connection groups, wherein each connection group corresponds to a plurality of the network connections, and wherein each connection group comprises aggregate connection properties based on properties of the connections in the respective connection groups;

weighting the connection groups based on a one or more of combined connection count, combined bandwidth, and connection duration; and transmitting the refined connection metadata comprising the weighted connection groups to a display terminal.

15. The non-transitory computer-readable storage medium of claim 14, the operations further comprising generating an interface configured to display the weighted connection groups.

16. The non-transitory computer-readable storage medium of claim 15, wherein the interface comprises interface entries configured to represent respective connection groups, and wherein the interface entries are sized in accordance to weights assigned to the corresponding connection groups.

17. The non-transitory computer-readable storage medium of claim 14, the operations further comprising receiving a selection of the ranking criterion through an input of the interface.

18. The non-transitory computer-readable storage medium of claim 14, wherein refining the connection metadata comprises combining connections to form the connection groups based a designated property of the network connections, wherein the designated property is one of a connection source, connection destination, connection port, connection protocol, user, and security policy.

* * * * *